June 6, 1967 N. E. HOAG ETAL 3,324,416

AMPLITUDE MODULATION SYSTEM

Filed Dec. 26, 1962 2 Sheets-Sheet 1

INVENTOR.
NELSON E. HOAG
JERRY L. HOLSINGER
BY Wood, Gust & Irish

ATTORNEYS

INVENTOR.
NELSON E. HOAG
JERRY L. HOLSINGER
BY Hood, Gust & Irish
ATTORNEYS

United States Patent Office 3,324,416
Patented June 6, 1967

3,324,416
AMPLITUDE MODULATION SYSTEM

Nelson E. Hoag, Fort Wayne, Ind., and Jerry L. Holsinger, Burlington, Mass., assignors to International Telephone and Telegraph Corporation, Nutley, N.J., a corporation of Maryland Filed Dec. 26, 1962, Ser. No. 247,186
18 Claims. (Cl. 332—44)

This invention relates generally to amplitude modulation systems, and more particularly to a system for amplitude modulating a variable amplitude input signal onto a square wave carrier and which does not employ transformers or push-pull tube circuits.

It is well known that the signal resulting from the amplitude modulation of a carrier signal contains as components the carrier frequency, the modulating signal frequency and the sum and difference frequencies, i.e., the upper and lower sidebands. It is frequently a requirement in a transmission system employing amplitude modulation that either the modulating or carrier frequencies be eliminated from the output signal. In conventional applications wherein the modulating and carrier frequencies are widely separated, balanced modulators have been employed with the output signal being taken from across a tuned circuit; the output signal thus contains only the upper and lower sidebands of the modulated signal with the carrier frequency being suppressed due to the balanced modulator action and the modulating frequency being filtered out by the tuned circuit. However, in conventional balanced modulator circuits employing vacuum tubes in a push-pull configuration, the degree of suppression of the carrier signal is affected by the closeness of the dynamic characteristics of both tubes; if one tube should vary with age more than the other, it is possible to have a variation in the carrier suppression of 10 db or more.

In certain television systems for use in the transmission of still pictures, it is desirable that the video signal be capable of transmission over regular voice-band telephone circuits. Such telephone circuits have a high frequency cut-off of approximately 2800 cycles thus requiring unusually low scanning rates in order to provide the requisite narrow band video signal. Since ordinary telephone circuits further have a low frequency cut-off of approximately 300 cycles and the narrow band video resulting from slow scanning extends essentially to direct current, it is necessary to employ a modulated carrier for transmitting the narrow band video information. This requirement creates a problem which is normally not encountered in conventional modulation systems since the modulating frequency and the carrier frequency are necessarily close together. By virtue of this close separation of the modulating frequency and the carrier frequency, the modulating frequency cannot be filtered out in accordance with conventional practice since the modulating signal and the lower sideband overlap, i.e., both are in the desired frequency spectrum.

It is therefore desirable to provide a system for the generation of an amplitude modulated signal with means for removing the modulating signal where the modulating frequency and the carrier frequencies are close together. Such a system may be provided by the use of a balanced modulator with the inputs reversed from those conventionally employed, i.e., with the carrier signal applied in push-pull and the modulating signal applied in phase. Such an arrangement provides the requisite signal, however, as indicated, suppression of the modulating signal still depends on the exactness of the balance of the modulator tubes. In a slow scan television system, complete suppression of the modulating signal is highly desirable in order to prevent distortion of the modulated signal over conventional voice band telephone circuits; telephone lines are not completely linear networks, and the presence of the modulating signal, even at low amplitude, will produce undesirable components in the received signal.

It is a further requirement in the case of television systems employing slow scanning rates that the modulator be capable of accepting a video signal with a direct current component. With the use of a vacuum tube balanced modulator, this has required that the video signal be directly coupled to the cathodes of the modulator tubes, which in turn has led to problems in maintaining constant output levels and a constant modulation factor. In addition, transistorized slow scan television equipment has been developed, thus making it desirable to provide a transistorized modulator for use therewith. By virtue of the above-referred to faults of tube balanced modulators and the fact that transistors are current-operated devices instead of voltage-operated devices, it is desirable to provide a modulator wherein either or both the modulating signal and the carrier signal may be removed with the modulating and carrier frequencies being close together, the modulator not employing transformers or a balanced push-pull circuit and being capable of being transistorized.

It is accordingly an object of the invention to provide an improved amplitude modulation system.

Another object of the invention is to provide an improved system for amplitude modulating a modulating signal upon a carrier wherein either or both the carrier signal and the modulating signal may be removed from the modulated signal where the carrier and modulating signal frequencies are narrowly separated.

A further object of the invention is to provide an improved amplitude modulation system wherein either or both the carrier and modulating signals may be removed from the modulated signal without the employment of transformers and vacuum tubes coupled in push-pull configuration.

Yet another object of the invention is to provide an improved modulator for use in a slow scan television system.

The invention in its broader aspects provides circuit means for providing a current flow responsive to the amplitude of the modulating signal, the circuit means including output means for developing an output signal responsive to the current flow therein. Means are provided for generating substantially square wave carrier signal pulses of given frequency, and means are provided coupling the generating means to the circuit means for interrupting the current flow in the output means in response to the pulses whereby the output signal is pulsed at the frequency of the square wave carrier signal. In order to remove the modulating signal component from the output signal, means are provided for providing another signal having half the amplitude of the modulating signal and inverted with respect thereto, and means are provided for adding the inverted half-amplitude signal and the output signal. In order to remove the carrier signal component from the output signal, means are provided for providing another signal having the same amplitude as the square wave carrier signal but inverted with respect thereto, and means are provided for adding the inverted signal and the output signal.

The above-mentioned and other features and objects of this invention and the manner of attaining them will become more apparent and the invention itself will be best understood by reference to the following description of an embodiment of the invention taken in conjunction with the acompanying drawings, wherein.

Figure 1:
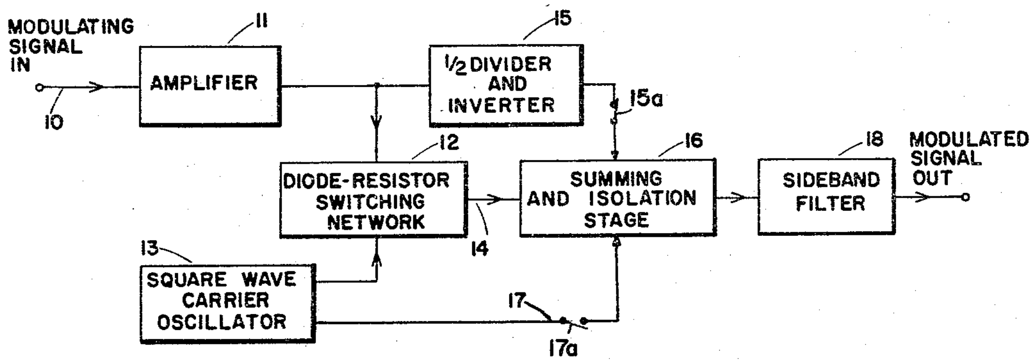
FIG. 1 is a block diagram illustrating the improved modulator of the invention.

Referring now to FIG. 1 of the drawings, the modulating signal, which may, for example, be a narrow band video signal having a frequency from 0 to 1750 cycles, is applied to the input circuit 10 of amplifier 11 which provides any necessary gain for the modulating signal and further provides the proper direct current level for the diode-resistor switching network 12. The amplifier 11 is coupled to the diode-resistor switching network 12 and normally provides a current flow therein responsive to the amplitude of the output signal from the amplifier 11.

A conventional oscillator 13, such as a multivibrator, generates a symmetrical square wave carrier signal at the desired frequency, such as 2.2 kc. The oscillator 13 is coupled to the diode-resistor switching network 12 in a manner to interrupt the current flow therein in response to the pulses of the square wave carrier signal thereby providing in the output circuit 14 of the network 12 an output signal which is pulsed at the frequency of the carrier signal. This output signal contains, as components, the original modulating frequency, the carrier frequency and both sidebands.

As will be demonstrated hereinafter, the modulating signal component of the modulated signal may be removed by adding thereto an inverted signal having one-half the amplitude of the modulating signal. Thus, a dividing and inverting circuit 15 is coupled to the amplifier 11 for providing a signal having half the amplitude of the output signal from the amplifier and inverted with respect thereto, this signal and the modulated signal from the output of the diode-resistor switching network 12 being added in the summing and isolation stage 16 when switch 15*a* is in the closed position. It will also be demonstrated that the carrier component of the modulated signal may be removed by adding thereto an inverted signal having the same amplitude as the square wave carrier coupled along conductor 17 with switch 17*a* in the closed position. If switch 15*a* is opened and switch 17*a* is closed, it is possible to cancel only the carrier signal component from the modulated signal. If both switches 15*a* and 17*a* are closed, both the modulating signal and carrier signal components are cancelled from the modulated signal output. The output signal from the summing and isolation stage 16 which has the modulating signal component and/or the carrier signal component removed therefrom may then be applied to sideband filter 18 which removes the upper sideband and also eliminates the harmonics from the square wave carrier signal impressed thereon.

Figure 2:
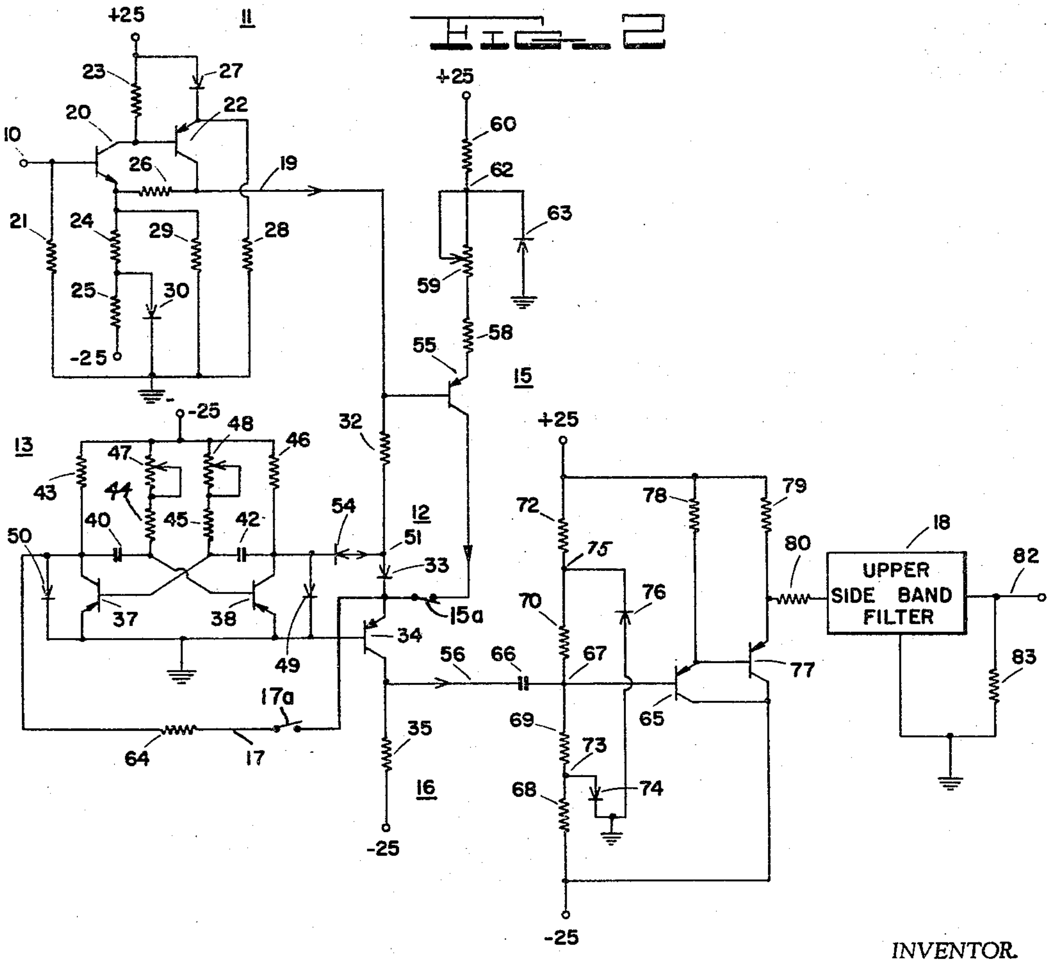
FIG. 2 is a schematic diagram of the system of FIG. 1.

Referring now to FIG. 2 wherein there is shown a specific embodiment of the invention suitable for use in a slow scan television system, the narrow band video signal impressed upon the input circuit 10 of amplifier 11 has a level variable between 0 and −3 volts. Amplifier 11 is a direct current stabilized feedback amplifier providing in its output circuit 19 the modulating signal having a level between 0 and +10 volts. Amplifier 11 comprises a transistor 20 having its base connected to input circuit 10 and its collector connected to the base of transistor 22 and to a source of +25 volts by resistor 23. The emitter of transistor 20 is connected to −25 volts by resistors 24 and 25 and to the collector of transistor 22 by resistor 26, output circuit 19 being taken from the collector of transistor 22. Transistor 22 is connected to +25 volts by diode 27 and to ground by resistor 28. The emitter of transistor 20 is connected to ground by resistor 29 and the point between resistors 24 and 25 is connected to ground by zener diode 30.

In this embodiment, the diode-resistor switching network 12 and the summing and isolation stage 16 in essence form a single series circuit comprising resistor 32, diode 33, the emitter and collector of transistor 34 and load resistor 35 connected between output circuit 19 and −25 volts.

The square wave carrier oscillator 13 takes the form of a conventional free-running multivibrator comprising transistors 37 and 38, capacitors 40 and 42, resistors 43, 44, 45 and 46, potentiometers 47 and 48, and zener diodes 49 and 50 connected in a conventional configuration and providing substantially square pulses 52 (FIG. 3) which are negative-going from 0 to −5 volts at a frequency of 2.2 kc. The collector of transistor 38 is connected to point 51 between resistor 32 and diode 33 by a diode 54.

Assuming now that transistor 55 of the divider and inverter circuit 15 is removed, it is seen that in the specific embodiment, transistor 34 is a PNP transistor and thus only a positive voltage applied to its emitter will cause current to flow. Diode 54 is a silicon diode requiring at least 0.6 volt forward drop for conduction, thus, when the output of oscillator 13 is at ground potential, i.e., 0 volts, diode 54 is back-biased, disconnecting the collector of transistor 38 from point 51. Under these conditions, i.e., in the absence of a negative-going pulse 52 in the output of oscillator 13, current will flow in the circuit 32, 33, 34, 35, in response to the amplitude of the modulating signal in the output circuit 19 of the amplifier 11. This current flow will provide an output signal across the load resistor 35 to which output circuit 56 is connected.

It will further be seen that when the output of the oscillator 13 is negative, i.e., in the presence of a −5 volts pulse 52, diode 54 is rendered conductive, thus applying the −5 volts pulse to point 51 and back-biasing diode 33. This isolates transistor 34 and resistor 35 from resistor 32 by diode 33, breaking the series circuit and interrupting the current flow through the transistor 34 and the resistor 35. Thus, the output signal appearing across resistor 35 in response to the modulating signal in the output circuit 19 of amplifier 11 is pulsed on and off at the frequency of the oscillator 13.

Figure 3:
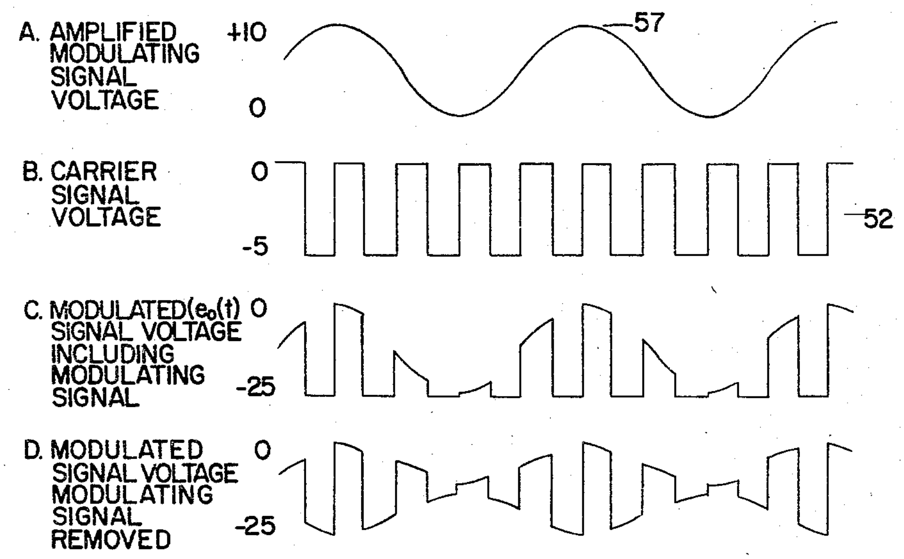
FIG. 3 is a diagram showing waveforms found in the system of FIG. 2 and useful in explaining the mode of operation of the invention.

Referring now to FIG. 3, a sine wave modulating signal 57 is shown in FIG. 3A having an amplitude from 0 to +10 volts, the 0 to −5 volt square wave carrier signal is shown in FIG. 3B and the resulting signal at the collector of transistor 34, i.e., output circuit 56 (and still assuming that the transistor 55 of the dividing and inverting circuit 15 is removed) is shown in FIG. 3C. Assuming this to be 100% modulation and considering only the fundamental term in the fourier expansion of the square wave carrier, it will be seen that the modulation envelope of $e_0(t)=2A_c[1+m \sin w_m t]$ where $A_c$=peak value of carrier with $m=0$
$A_m$=peak value of modulating signal
$m=A_m/2A_c$ With $m=0$, the $e_0(t)$ may be written $$e_0(t)=A_c[1+\sin w_c t]$$

when $m\neq 0$ $A_c$ becomes a function of time which is equal to the peak value of the modulation envelope times $1+m \sin w_m t$.

Thus for $m \neq 0$ $$e_0(t) = A_c(t)[1+\sin w_c t]$$
$$= A_c[1+m \sin w_m t][1+\sin w_c t]$$
$$= A_c[1+\sin w_c t \quad (1)$$
$$+m \cos (w_c+w_m)t \quad (2)$$
$$+m \cos (w_c-w_m)t] \quad (3)$$
$$+\frac{/A_m}{2} \sin w_m t \quad (4)$$

The above expression shows that the signal appearing at the collector of transistor 34 contains all of the signal components, i.e., expression (1) is the carrier frequency, expression (2) is the upper sideband, expression (3) is the lower sideband, and expression (4) is the modulating frequency, shown to be at one-half (½) amplitude. It will thus be seen that adding to the output signal at the collector of transistor 34, a signal having half the amplitude of the modulating signal, and inverted with respect thereto wil result in subtraction, i.e., cancellation, of the modulating signal component. This is accomplished in the specific embodiment of FIG. 2 by injecting into the emitter of transistor 34 a current which is one-half (½) the amount contributed by the modulating signal across load resistor 35 and 180° out of phase with respect thereto. Thus, transistor 55 has its base connected to output circuit 19 of amplifier 11, its collector connected to the emitter of transistor 34, and its emitter connected to +25 volts by resistor 58, potentiometer 59 and resistor 60, point 62 between potentiometer 59 and resistor 60 being connected to ground by zener diode 63. It will thus be seen that the emitter and colector of transistor 34 and resistor 35 are in series with the collector of transistor 55 as well as with resistor 32 and diode 33, and thus that the current in each circuit is added in resistor 35 to provide the resulting output signal waveform as shown in FIG. 3D.

It will further be seen by examination of the above expression that the carrier component may be removed by adding to the output signal (again assuming transistor 55 removed) a signal having the same amplitude as the carrier signal, but inverted with respect thereto. This may be accomplished by connecting a resistor 64 between the collector of transistor 37 of the oscillator 13 and the emitter of transistor 34 through the closed switch 17*a*. It will be observed that either or both the modulating signal and carrier signal components may be removed from the output signal in the manner described by proper operation of switches 15*a* and 17*a*.

Output circuit 56 of transistor 34 is coupled to the base of transistor 65 by coupling capacitor 66. The base of transistor 65 is connected to point 67 on the voltage divider comprising resistors 68, 69, 70 and 72 coupled between +25 volts and −25 volts. Point 73 between resistors 68 and 69 is connected to ground by zener diode 74 and point 75 between resistors 70 and 72 is likewise connected to ground by zener diode 76, this voltage dividing network providing a direct current reference voltage of 0 volts for the modulated signal. Transistors 65 and 77 are connected in a conventional double emitter follower configuration with resistors 78 and 79. The emitter of transistor 77 is connected to the input of the upper sideband filter 18 by resistor 80. The output circuit 82 of the upper side band filter 18 which thus carries the resulting modulated signal with the upper sideband component removed is connected to ground by resistor 83 to provide the desired output impedance characteristics.

In the specific embodiments shown in FIG. 2, the following component values may be employed:

| | |
|---|---|
| Trans. 20 | 2N358A |
| R 21 ____ohms | 620 |
| Trans. 22 | 2N1377 |
| R 23 | 10K |
| R 24 | 4.7K |
| R 25 | 4.7K |
| R 26 | 10K |
| Diode 27 | 1N459 |
| R 28 | 27K |
| R 29 | 8.2K |
| Diode 30 | 1N751 |
| R 32 | 10K |
| Diode 33 | 1N277 |
| Trans. 34 | 2N1377 |
| R 35 | 27K |
| Trans. 37, 38 | 2N1377 |
| C 40, 42 ____mf | .01 |
| R 43, 46 | 10K |
| R 44, 45 | 100K |
| R 47, 48 | 50K |
| Diodes 49, 50 | 1N751 |
| Diode 54 | 1N459 |
| Trans. 55 | 2N1377 |
| R 58 | 10K |
| R 59 | 50K |
| R 60 | 4.7K |
| Diode 63 | 1N759 |
| Trans. 65 | 2N1377 |
| C 66 ____mf | 10 |
| R 68, 72 | 10K |
| R 69, 70 | 27K |
| Diodes 74, 76 | 1N751 |
| Trans. 77 | 2N1039 |
| R 78 | 47K |
| R 79 | 3.9K |
| R 80 ____ohms | 560 |
| R 83 ____do | 620 |

It will now be seen that there is provided in accordance with the invention a modulator which provides a balanced modulator type of action, but without the use of matched tubes or transformers. It will further be seen that through the use of a square wave carrier and a diode-resistor network, either or both the modulating signal or carrier signal components may be suppressed, even with the modulating and carrier signal frequencies very close together, i.e., as close as .9, and that suppression of the unwanted signal or signal does not vary with aging of components.

While we have described above the principles of our invention in connection with specific apparatus, it is to be clearly understood that this description is made only by way of example and not as a limitation to the scope of our invention.

What is claimed is:

1. A system for amplitude modulating a variable amplitude input signal onto a square wave carrier comprising: circuit means for providing a current flow responsive to the amplitude of said input signal, said circuit means including output means for developing an output signal responsive to said current flow; means for generating symmetrical square wave carrier signal pulses of given frequency; means coupling said generating means to said circuit means for interrupting said current flow in said output means in response to said pulses whereby said output signal is pulsed at the frequency of said square wave signal; means for providing a first signal having half the amplitude of said input signal and inverted with respect thereto; and means for adding said first signal and said output signal whereby the input signal component in said output signal is cancelled.

2. The system of claim 1 further comprising bandpass filter means coupled to said output means for eliminating the upper side band component and the harmonics from said output signal.

3. The system of claim 1 further comprising means for providing a second signal having the same amplitude as said square wave signal and inverted with respect thereto; and means for adding said second signal and said output signal whereby the carrier signal component in said output signal is cancelled.

4. A system for amplitude modulating a variable amplitude input signal onto a square wave carrier comprising: first circuit means for providing a first current flow responsive to the amplitude of said input signal, said first circuit means including output means for developing an output signal responsive to said first current flow; means for generating first symmetrical square wave carrier signal pulses of given frequency; means coupling said generating means to said first circuit means for interrupting said first current flow in response to said pulses whereby said output signal is pulsed at the frequency of said first square wave signal; and a second circuit means coupled to said first circuit means for providing a second current flow in said output means having half the amplitude of said first current flow and inverted with respect thereto, said first circuit means including means for adding said first and second current flows in said output means whereby the input signal component in said output signal is cancelled.

5. The system of claim 4 further comprising a third circuit means coupled to said first circuit means for providing a third current flow in said output means responsive to second square wave signal pulses having the same amplitude as said first square wave pulses but inverted with respect thereto, said first circuit means including means for adding said first and third current flows in said output means whereby the carrier signal component in said output signal is cancelled.

6. A system for amplitude modulating a variable amplitude input signal onto a square wave carrier comprising: an input circuit for receiving said input signal; a voltage dividing circuit coupled to said input circuit for providing a current flow responsive to the amplitude of said input signal, said dividing circuit including output means for developing an output signal responsive to said current flow and electronic valve means having means for controlling the current flow in said circuit; means for generating symmetrical square wave carrier signal pulses of given frequency; and means coupling said generating means to said dividing circuit for interrupting said current flow in said valve means and said output means in response to said pulses whereby said output signal is pulsed at the frequency of said square wave signal.

7. The system of claim 6 wherein said coupling means includes means for isolating said valve means and output means from said input circuit responsive to said pulses, thereby to interrupt said current flow.

8. The system of claim 7 further comprising another circuit coupled to said valve means for providing another current flow therein and in said output means having half the amplitude of said first-named current flow and inverted with respect thereto whereby said first-named and other current flows are added in said output means thereby cancelling the input signal component from said output signal.

9. The system of claim 7 further comprising another circuit coupled to said valve means for providing another current flow therein and in said output means responsive to other square wave signal pulses having the same amplitude as said first-named pulses but inverted with respect thereto whereby said first-named and other current flows are added in said output means thereby cancelling the carrier signal component from said output signal.

10. The system of claim 7 wherein said valve means includes a control element coupled to a source of reference potential, wherein said isolating means comprises rectifier means normally passing said current flow, and wherein said coupling means further comprises means for rendering said rectifier means nonconductive responsive to said pulses.

11. A system for amplitude modulating a variable amplitude input signal onto a square wave carrier comprising: an electronic valve means including rectifying elements and a control element; an input circuit for receiving said input signal; a voltage dividing circuit comprising a first resistor, first diode means, said rectifying elements of said valve means, and a load resistor all serially connected across said input circuit and a source of potential for normally providing a current flow responsive to the amplitude of said input signal whereby an ouput signal responsive to said current flow is developed across said load resistor; means for generating symmetrical square wave signal pulses of given frequency; said control element of said valve means being connected to a source of reference potential; second and third diode means coupling said generating means to said reference potential source and to the side of said first diode means remote from said valve means, respectively, for rendering said first diode means non-conductive responsive to said pulses thereby isolating said first resistor from said valve means and load resistor and interrupting said current flow therein whereby said output signal is pulsed at the frequency of said square wave signal.

12. The system of claim 11 wherein said valve means comprises a transistor having its emitter connected to said first diode means, its collector connected to said load resistor, and its base connected to said reference potential.

13. The system of claim 12 further comprising circuit means coupled to said input circuit and to said emitter for providing another current in said transistor and load resistor having half the amplitude of said first-named current and inverted with respect thereto whereby said first-named and other currents are added in said load resistor thereby cancelling the input signal component from said output signal.

14. The system of claim 13 further comprising filter means coupled to said collector for eliminating the upper side band component and the harmonics from said output signal.

15. The system of claim 12 further comprising circuit means coupled to said emitter for providing another current flow in said transistor and load resistor responsive to other square wave pulses having the same amplitude as said first-named pulses but inverted with respect thereto whereby said first-named and other currents are added in said load resistor thereby cancelling the carrier signal component from said output signal.

16. The system of claim 12 wherein said input circuit comprises an amplifier including means for providing a direct-current level for said input signal whereby said current flow in said divider circuit is unidirectional.

17. A system for amplitude modulating a variable amplitude input signal onto a square wave carrier comprising: a source of said input signal; circuit means coupled to said source of said input signal for providing a current flow responsive to the amplitude of said input signal, said circuit means including output means for developing an output signal responsive to said current flow; means for generating symmetrical square wave carrier signal pulses of given frequency; first means coupling said generating means to said circuit means for interrupting said current flow in said output means in response to said pulses to pulse said output signal at the frequency of said square wave signal, said output signal including upper and lower sideband signal components of said input signal and said square wave signal, an input signal component, and a square wave signal component; and second means coupling an inverted version of said input signal having an amplitude equal to one half the amplitude of said input signal to said circuit means to cancel said input signal component present in said output signal.

18. A system for amplitude modulating a variable amplitude input signal onto a square wave carrier comprising: a source of said input signal; circuit means coupled to said source of said input signal for providing a current flow responsive to the amplitude of said input signal, said circuit means including output means for developing an output signal responsive to said current flow; means for generating symmetrical square wave carrier signal pulses of given frequency; first means coupling said generating means to said circuit means for interrupting said current flow in said output means in response to said pulses to pulse said output signal at the frequency of said square wave signal, said output signal including upper and lower sideband signal components of said input signal and said square wave signal, an input signal component, and a square wave signal component; and second means coupling both an inverted version of said input signal having an amplitude equal to one half the amplitude of said input signal and an inverted version of said square wave signal having an amplitude equal to the amplitude of said square wave signal to said circuit means to cancel both said input signal component and said square wave signal component present in said output signal.

References Cited

UNITED STATES PATENTS

| | | | |
|---|---|---|---|
| 2,992,326 | 7/1961 | Kahn | 332—44 |
| 3,122,715 | 2/1964 | Buck | 332—44 |
| 3,229,230 | 1/1966 | Feldman | 332—44 |

ROY LAKE, *Primary Examiner.*